April 30, 1940.　　　　　K. PETERSEN　　　　　2,198,737
METHOD OF TREATING WASTE MATERIALS CONTAINING ORGANIC SUBSTANCES OF ANIMAL
OR VEGETABLE ORIGIN BY MESOPHILE OR THERMOPHILE ANAEROBIC CONVERSION
Filed June 25, 1938
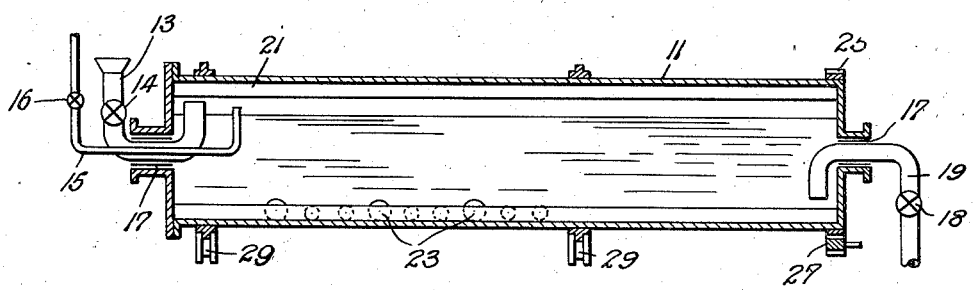
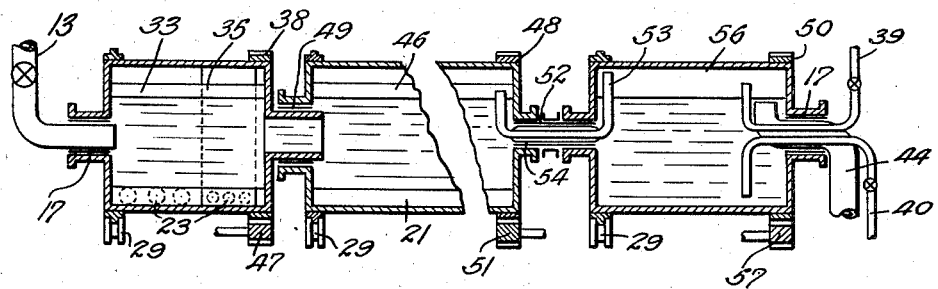
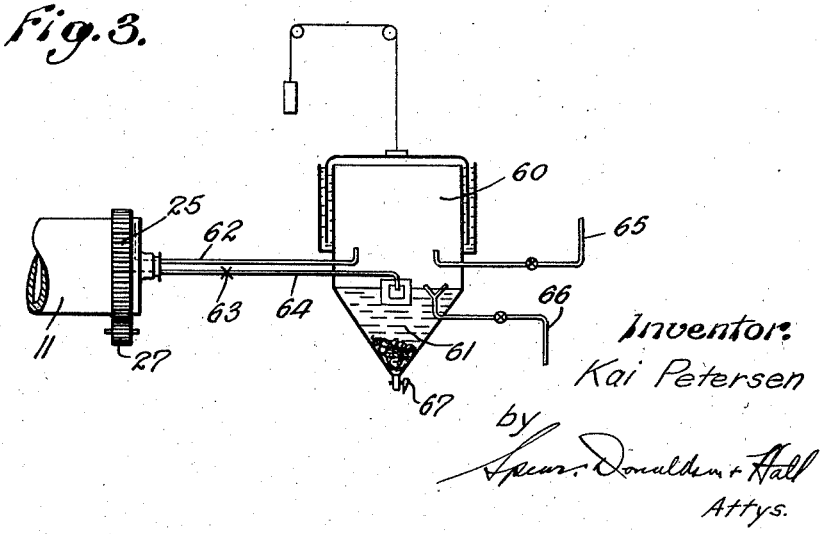
Inventor:
Kai Petersen Patented Apr. 30, 1940

2,198,737

UNITED STATES PATENT OFFICE 2,198,737

METHOD OF TREATING WASTE MATERIALS CONTAINING ORGANIC SUBSTANCES OF ANIMAL OR VEGETABLE ORIGIN BY MESOPHILE OR THERMOPHILE ANAEROBIC CONVERSION

Kai Petersen, Buddinge Vaerk, Soborg, near Copenhagen, Denmark

Application June 25, 1938, Serial No. 215,932
In Denmark June 29, 1937

5 Claims. (Cl. 210—2)

This invention relates to a method of treating waste materials containing organic substances of animal or vegetable origin by mesophile or thermophile anaerobic conversion.

It is known to convert waste materials, such as garbage and night soils, industrial refuse as well as waste materials from horticulture, agriculture and forestry into fertilizers or substances not causing hygienic difficulties and to purify sewage and the like foul waste waters by means of biological processes. Hereby use has been made of the ability of the microorganisms occurring in nature to decompose the organic components of the materials mentioned; and according to the employment of aerobic or anaerobic microorganisms an aerobic or anaerobic conversion or purification has been obtained, whereas the temperature at which the process takes place has been determining for whether the conversion or purification has been effected by means of mesophile or thermophile microorganisms.

The mesophile and thermophile anaerobic decomposition which has been used particularly in purifying waste waters is a fermentative and putrefactive process taking place with formation of bad smell and a relatively large evolution of gases (methane, hydrogen sulphide, carbon dioxide, etc.) and beyond being of course dependent on the substances present the said decomposition is, as is well-known highly dependent on the condition under which the decomposition takes place. When the decomposition is properly governed a gas can be obtained having an excellent calorific power, in some cases even higher than that of ordinary illuminating gas.

The present invention relates to a treatment of waste materials containing organic substances of animal or vegetable origin by mesophile or thermophile anaerobic conversion. As starting materials for the method according to the invention the more or less solid waste materials referred to above may be used, such as sewage sludge, garbage and night soil, packing house refuse, industrial refuse as well as waste materials from horticulture, agriculture and forestry or mixtures thereof; and the object of the invention is then to obtain from a starting material in question a gas yield as large as possible and the smallest possible amount of sludge. The invention may also be used in purifying sewage and the like foul waste waters in which case the gas yield and the remaining mass of sludge have only secondary importance.

The invention also relates to an apparatus for carrying out the anaerobic conversion.

From the above mentioned anaerobic purification of waste waters ordinarily taking place in septic tanks or Emscher wells it is known to be connected with difficulties to start the proper fermentation and to maintain the said fermentation with formation of large amounts of gas. It is also known that acid-forming microorganisms may easily be predominating both when starting and during the operation whereby a vigorous foaming and reducted gas evolution occur, the intended development of the gas-forming putrefying bacteria being retarded by the formation of acids. Such acid-forming fermentation will particularly occur in the presence of large carbohydrate contents and the said fermentation may from an occasional place propagate through the whole mass. Even by the agitation hitherto used it has not been possible to completely secure the avoidance of an extending acid fermentation, since from nature's hand there are more than equal chances that an undesired acid fermentation will set in than that the "methane fermentation" aimed at will be produced and maintained. Moreover, it has been practically difficult to perform heating during the conversion so that at certain seasons a very slow and sometimes very small decomposition will be obtained.

The present invention provides a method and an apparatus by which, compared with hitherto known methods using a mesophile or thermophile anaerobic conversion, a highly increased capacity and an increased regulation and control of the course of the process are obtained whereby the conversion may be practically completely governed and the most frequently objectionable secondary effects easily occurring in the known methods may be avoided. Moreover by means of the present invention a more complete decomposition of the putrefactive substances may be obtained. Thereby, a higher gas yield and a smaller amount of sludge being at the same time more highly putrefied are obtained.

The method according to the invention includes the step which comprises supplying the sludge to a rotary solid-walled container to the interior of which there is no free access to atmospheric air; rotating the said compartment to prevent sedimentation of any portion of the sludge and to provide agitation and intermixing of the whole sludge mass; and continuing the said mode of operation thereby effecting an anaerobic decomposition of the organic components of the sludge mass resulting in the evolution of combustible gases, the said agitation and intermixing caused by the rotation of the said compartment facilitating the separation of the gases from the sludge particles and counteracting the appearance of an acid-forming, foam-producing fermentation which may be detrimental to the gas-producing fermentation. Generally, it will be preferred to subject the material being treated to a turning over and intermixing in addition to the intermixing produced by the rotary movement of the container and to subject the material to grinding prior to or during or both prior to and during the anaerobic decomposition. However, how the method is carried out depends on the class of raw material in question. Therefore, other characteristic features of the method according to the invention together with the features of the apparatus designed for carrying out the same will be stated in the following with reference to the drawing diagrammatically illustrating various embodiments of an apparatus for carrying out the method according to the invention.

Figure 1 shows a vertical longitudinal sectional view of an embodiment of the apparatus according to the invention, Figure 2 a similar sectional view of another embodiment and Figure 3 partly in section a further embodiment of the apparatus.

The apparatus shown in Figure 1 consists of a horizontally disposed solid-walled container 11 rotatably supported on rollers 29 and at its one end provided with a gear ring 25 meshing with a pinion 27. This pinion is operated by a power source not shown for revolving the container. The said container is internally provided with blades 21 and contains grinding bodies 23, such as marble balls, iron balls, stone shippings, inorganic waste materials or the like. By means of an air- and water-tight connection 17 which may be of a construction known per se there are passed through the one end plate of the container both an inlet pipe 13 for the material to be treated which pipe terminates inside the container at the top (ceiling) thereof, and an outlet pipe 15 for discharging the gas formed during the treatment. The pipe 15 may conveniently be connected with a gasometer not shown for collecting the gas. An outlet pipe 19 for the putrefied sludge and the accompanying liquid is passed through the other end bottom of the container. Also at this place an air- and water-tight connection 17 is provided. The pipes 13, 15 and 19 are provided with valves 14, 16 and 18, respectively.

The apparatus described above is particularly used in treating sludgy waste materials or waste materials, such as night soil which may easily be converted into sludge during the rotating of the container by means of the grinding bodies 23.

When starting the apparatus the material to be treated, if desired, with addition of water and pH-controlling substances, such as lime is supplied to the container through the inlet pipe 13, the outlet pipe 19 being kept closed. It may be preferred to supply a suitable bacteria culture together with the material to be treated so that the biological conversion aimed at is quickly obtained. For this purpose the putrefied sludge from a previous conversion may, for instance, be used. When the container is filled the inlet pipe 13 is closed and the container is rotated by means of the pinion 27. The container is first rotated quickly so that an effective distribution of the inoculating material (eventually supplied) into the starting material and a quick and good disintegration and distribution of the latter are provided. When the anaerobic fermentation is well started the velocity of the container is somewhat reduced. The gas produced during the conversion flows through the outlet pipe 15 to a burner or a gasometer or another exploiting or collecting place for the gas. When the conversion is finished the velocity of the container is further reduced so that the container is rotated quite slowly or completely stopped, if desired, in order to promote sedimentation of the putrefied sludge residue. After resulting sedimentation the sludge and the accompanying liquid are discharged through the outlet pipe 19. A suitable portion of the putrefied sludge may be retained as inoculating material for new starting material. Instead of being discharged jointly the putrefied sludge and the accompanying liquid may be discharged separately, for instance by different adjustments of the pipe 19.

If desired, the putrefied sludge may then be subjected to an aerobic after-treatment which may also be the case with the liquid discharged. If desired, both may be after-treated jointly.

When the sludge is subjected to an aerobic after-treatment which may be considered most appropriate or when not it may in both cases be employed as a fertilizer.

Instead of carrying out the method discontinuously as described above it may also be carried out continuously. For this purpose, however, the embodiments of the apparatus described in the following are particularly suited.

By treating the raw material in the manner mentioned above a uniform conversion will be obtained throughout the container, whereas conditions are provided that the conversion becomes so completely as possible, the rotation of the container and the simultaneous grinding providing a uniform disintegration and distribution of the material and a uniform distribution of the micro-organisms. Thus, it is avoided that at some places of the container lumps of starting material are present and an accumulation of the sludge occurs. An acid fermentation is almost excluded and if such a fermentation should set in at local places of the container it will be quickly stifled due to the intensive agitation of the material.

If the starting material is not present in the form of sludge or if the said material may not be easily converted into such form by the grinding bodies eventually present in the container the material should be subjected to grinding prior to or during the conversion. Grinding may be effected in a rotary chamber communicating with the compartment in which the anaerobic conversion substantially takes place, the said grinding chamber being preferably rotated at a velocity higher than that of the said compartment. The latter may be divided into two chambers being operated at different velocities, the chamber nearest to the outlet end of the apparatus being operated at the lowest velocity, preferably a velocity being so low that a quick sedimentation takes place. An apparatus of this construction is shown in Figure 2.

The grinding compartment 33, 35 is provided with a gear ring 38 connecting with a pinion 47 which is operated by a power source not shown. By means of an air- and water-tight connection 49 the grinding compartment is connected with the compartments 46 and 56, respectively, in which the anaerobic conversion particularly takes place. Blades 21 are provided in the compartment 46. As no agitation of the material is effected in the compartment 56 beyond the agitation produced by the rotation of the container a sedimentation of the putrefied sludge residue will here proceed to some extent. Therefore, at the outlet end of the container a separate pipe 40 is provided for discharging the sludge, while the liquid is discharged through a pipe 44.

The compartment 46 in which the main conversion takes place is provided with a gear ring 48 meshing with a pinion 51 which is operated by a power source not shown and the almost completely converted material flows then into a compartment 56 where an after-conversion and sedimentation take place. The gas produced in the compartment 46 passes through a pipe 53 into the compartment 56 and is discharged through a pipe 39. Connection is provided between the compartment 46 and the compartment 56 in a manner known per se by means of a pipe section 52 and an air- and water-tight connection 54. The compartment 56 is provided with a gear ring 50 and operated by a pinion 57 meshing therewith.

The apparatus shown in Figures 1 and 2 may be modified in several respects without falling beyond the scope of the invention. Thus, the inlet and outlet pipes may all be arranged at one end of the container whereas the inlet pipe for the starting material may extend to the interior bottom side of the container. The container may also be provided with other agitating devices than the blades shown in order to produce a more intensive agitation restricted to the upper layers of the liquid, if desired. The presence of grinding bodies is neither absolutely necessary in that it depends on the raw material in question.

As the essential feature of the invention consists therein that the anaerobic conversion is wholly or substantially effected in a rotary, solid-walled container or drum it is to be understood that pre- and after-treatments being eventually necessary or suitable according to the condition of the starting materials and the result aimed at and falling within the scope of the invention may be carried out per se in any suitable manner. It is to be particularly pointed out that, for instance, the invention is not restricted to the provision of effecting a sedimentation of the sludge residue in a turnable container in that the sedimentation and a second putrefaction, if desired, may be effected in one or more separate and stationary sedimentation containers.

If desired, such a stationary sedimentation container may be combined with a gasometer whereby a simple plant is obtained.

An embodiment of such an apparatus is shown diagrammatically in Figure 5.

In this figure, 11 designates in conformity with Figures 1 or 2 a rotatable container or drum in which the whole or substantial part of the anaerobic conversion takes place and which is operated by a gear ring 25 and a pinion 27 whereas 60 is a gasometer the lower part 61 of which serves as sedimentation and after-putrefaction container. The gas produced in the container 11 is transferred to the gasometer through a pipe 62 and again removed from the said gasometer through a pipe 65 and through a pipe 64 provided with a valve 63 the sludge residue and the liquid remaining after the conversion are passed to the lower part 61 of the gasometer and at this place subjected to a sedimentation and also to an after-putrefaction, if desired. The putrefied sludge may be tapped off at the bottom through a cock 67 while the liquid may be discharged through a pipe 66.

The gas produced by the anaerobic conversion may be utilized as a power or illuminating agent or for heating the material being treated in a manner known per se in that the starting material may be heated prior to its entrance into the container or the said container may be provided with suitable heating devices, such as a heating jacket or internal heating pipes. However, the heating of the material may also be provided in another way if a thermophile conversion be desired.

In the same way, the anaerobic conversion may be mesophile or thermophile or the method may be divided into a mesophile fermentation and a thermophile one.

In order to maintain the proper bacteria stock a portion of purified sludge residue is returned to the apparatus in a manner known per se.

In the above description and in the following patent claims the expression "anaerobic conversion" is employed in accordance with the common terminology, but as it cannot be said to be scientifically proved that the methane-producing microbes are working absolutely anaerobic the supposition to the contrary being recently advanced from different sides that the methane fermentation is produced by micro-aerophile microbes it will be understood that the expression referred to above must be interpreted with some discretion and that it also falls within the scope of the invention to adopt measures for supplying oxygen or other controlling media (in a gaseous, liquid or solid state) to the conversion container and for controlling the pressure therein, if desired. In view of the supposition referred to it may namely be appropriate at a certain operating condition to dispose of means for controlling the oxygen pressure of the material during the various steps of putrefaction and means for maintaining a well suited specific pressure upon the material being putrefied so that increased control of the putrefying velocity and the proportion of sludge residue to gas yield are obtained.

As already mentioned above it may be appropriate to use means for supplying pH-controlling agents to the conversion container, for instance lime.

If desired, also suitable nutriments to the microorganisms the developments of which it is aimed at to promote may be added.

Having thus fully described my invention I claim as new and desire to secure by Letters Patent:

1. In a method of treating sewage sludge and other organic waste materials in slurry condition by means of anaerobic gas-producing fermentation, the step which comprises supplying the sludge to a rotary solid-walled container to the interior of which there is no free access to atmospheric air; rotating the said compartment to prevent sedimentation of any portion of the sludge and to provide agitation and intermixing of the whole sludge mass; and continuing the said mode of operation thereby effecting an anaerobic decomposition of the organic components of the sludge mass resulting in the evolution of combustible gases, the said agitation and intermixing caused by the rotation of the said compartment facilitating the separation of the gases from the sludge particles and counteracting the appearance of an acid-forming, foam-producing fermentation which may be detrimental to the gas-producing fermentation.

2. In performing the method claimed in claim 1, the use of loose grinding and friction bodies arranged inside the rotary compartment the said bodies supporting the intermixing and homogenizing action produced by the rotation of the said compartment and keeping the interior walls of the same clean by rubbing off the sludge particles adhering thereto.

3. Method as claimed in claim 1 which comprises reducing the speed of rotation of the rotary compartment to allow sedimentation of the sludge particles when the major portion of the anaerobic fermentation has taken place and separately removing the clarified liquid and the settled sludge residue from the said compartment.

4. Method as claimed in claim 1, which comprises transferring the sludge from the rotary compartment to a stationary compartment when the major portion of the anaerobic fermentation has taken place, allowing a sedimentation to occur in the said stationary compartment and separately removing the clarified liquid and the settled sludge residue therefrom.

5. In an apparatus for treating sewage sludge and other organic waste materials in slurry condition by means of anaerobic gas-producing fermentation the combination of a rotary solid-walled container being substantially horizontally disposed and to the interior of which there is no free access to atmospheric air, two end plates closing the opposite ends of the said container, means for rotating the container, a pipe for supplying the sludge to be treated, a pipe for discharging the fermented sludge residue and a pipe for discharging the gases formed during the fermentation, said pipes extending axially through the said end plates and being air- and water-tightly connected therewith.

KAI PETERSEN.